(12) United States Patent
Tindell

(10) Patent No.: US 11,924,003 B2
(45) Date of Patent: Mar. 5, 2024

(54) CONTROLLER AREA NETWORK (CAN) BUS SECURITY INVENTION

(71) Applicant: Canis Automotive Labs Limited, Isle of Wight (GB)

(72) Inventor: Kenneth William Tindell, Suffolk (GB)

(73) Assignee: Canis Automotive Labs Limited, Isle of Wight (GB)

( * ) Notice: Subject to any disclaimer, the term of this patent is extended or adjusted under 35 U.S.C. 154(b) by 153 days.

(21) Appl. No.: 17/451,787

(22) Filed: Oct. 21, 2021

(65) Prior Publication Data

US 2022/0038304 A1 Feb. 3, 2022

Related U.S. Application Data

(63) Continuation of application No. PCT/GB2020/051031, filed on Apr. 27, 2020.

(30) Foreign Application Priority Data

Apr. 29, 2019 (GB) .................................... 1905947

(51) Int. Cl.
*H04L 12/40* (2006.01)
*G06F 11/20* (2006.01)

(52) U.S. Cl.
CPC .... *H04L 12/40104* (2013.01); *G06F 11/2002* (2013.01); *H04L 12/40071* (2013.01);
(Continued)

(58) Field of Classification Search
CPC ....... H04L 1/0041; H04L 9/14; H04L 9/0894; H04L 12/40143; H04L 63/126;
(Continued)

(56) References Cited

U.S. PATENT DOCUMENTS

2002/0169844 A1* 11/2002 Jammes .................. H04L 47/11
709/207
2012/0005297 A1* 1/2012 Robles Gil Daellenbach ............
G07F 9/02
709/208
(Continued)

FOREIGN PATENT DOCUMENTS

CN 105745862 A 7/2016
EP 3050251 A1 8/2016
(Continued)

OTHER PUBLICATIONS

Patent Cooperation Treaty (PCT); "International Search Report"; dated May 27, 2020; pp. 2-4.
(Continued)

*Primary Examiner* — Dustin Nguyen
(74) *Attorney, Agent, or Firm* — William W. Cochran; Cochran Freund & Young LLC

(57) ABSTRACT

A serial communication system for communicating data over a Controller Area Network (CAN) bus comprises a security slave device located between a first system node and a Controller Area Network (CAN) bus. The system is characterised in that: said security slave device further comprises a tagging means for inserting data indicative of said first node into a Controller Area Network (CAN) frame received from said first node; said system further comprises a security master device, located between said Controller Area Network (CAN) bus and a second system node; said security master device further comprises a means of extracting said data indicative of first said node from a received data frame; and said system further comprises a means of checking the validity of received Controller Area Network (CAN) frame associated to said extracted data indicative of said first node.

8 Claims, 4 Drawing Sheets

(52) U.S. Cl.
CPC ............... *H04L 12/40084* (2013.01); *H04L 2012/40215* (2013.01)

(58) Field of Classification Search
CPC ..... H04L 63/0876; H04L 12/40; H04L 47/11; G07F 9/02; G06F 11/0784; G06F 21/6218; G06F 13/36; H04W 4/48; B60L 53/11
See application file for complete search history.

(56) References Cited

U.S. PATENT DOCUMENTS

| | | | |
|---|---|---|---|
| 2014/0032800 | A1 | 1/2014 | Peirce et al. |
| 2014/0328357 | A1 | 11/2014 | Fredriksson et al. |
| 2015/0089236 | A1 | 3/2015 | Han et al. |
| 2016/0173513 | A1* | 6/2016 | Rohde ................... H04L 63/126 726/23 |
| 2016/0288658 | A1* | 10/2016 | Rudolph ................. B60L 53/11 |
| 2016/0342531 | A1* | 11/2016 | Sharma ............ H04L 12/40143 |
| 2017/0213043 | A1* | 7/2017 | Rajnak ................ G06F 21/6218 |
| 2017/0235698 | A1* | 8/2017 | van der Maas ..... G06F 11/0784 710/106 |
| 2018/0167216 | A1* | 6/2018 | Walrant ................ H04L 9/0894 |
| 2018/0295112 | A1* | 10/2018 | Coppola ................. H04W 4/48 |
| 2019/0026103 | A1* | 1/2019 | Van Der Maas ... G06F 11/0784 |
| 2019/0104149 | A1* | 4/2019 | Zeng ................... H04L 63/0876 |
| 2019/0281052 | A1* | 9/2019 | Lekkas ..................... H04L 9/14 |
| 2020/0136754 | A1* | 4/2020 | Hoermaier ............ H04L 1/0041 |
| 2020/0304467 | A1* | 9/2020 | Cozzetti .............. H04L 63/1425 |
| 2022/0046114 | A1* | 2/2022 | Entelis .................... H04L 12/40 |

FOREIGN PATENT DOCUMENTS

| | | |
|---|---|---|
| KR | 20160060683 A | 5/2016 |
| WO | 2015048058 A1 | 4/2015 |

OTHER PUBLICATIONS

Tindell, Dr. Ken; "CAN-HG Technology Briefing"; Canis Automotive Labs; Published Jul. 18, 2018; Retrieved May 8, 2020; https://canislabs.com/wp-content/uploads/2018/07/2018-07-18-CAN-HG-Technology-Briefing_v2.pdf.

Voss, Wilfried; "Controller Area Network (CAN Bus)—Message Frame Architecture"; Copperhill Technologies; Published Nov. 21, 2018; Retrieved 2020-05-2018; https://copperhilltech.com/blog/controller-area-network-can-bus- message-frame-architecture/.

Anonymous; "Can Bus": Wikipedia; Published Apr. 16, 2019; Retrieved May 18, 2020; https://en.wikipedia.org/w/index.php?1%20itle=CAN%20bus&oldid=892688830.

Tindell, Dr. Ken; "CAN protocol enhancement"; CAN Newsletter Mar. 2018; Published Mar. 18, 2018; Retrieved May 15, 2020: https://can-newsletter.org/uploads/media/raw/a97cf05a50e6acab5976710d0c5bf7ee.pdf.

* cited by examiner

CONTROLLER AREA NETWORK (CAN) BUS SECURITY INVENTION

CROSS-REFERENCE TO RELATED APPLICATIONS

This Non-Provisional Patent Application is a continuation of International Patent Application No PCT/GB2020/051031, filed on Apr. 27, 2020, which claims priority to United Kingdom Application Number GB1905947.6, filed on Apr. 29, 2019, both of which are specifically incorporated herein by reference for all that they disclose and teach.

FIELD OF THE INVENTION

The invention relates to protecting a serial communication system and method for protecting the communication of data over a Controller Area Network (CAN) Bus.

BACKGROUND TO THE INVENTION

It is known that there are two key attack types for a Controller Area Network (CAN), these are:
  Spoofing of Controller Area Network (CAN) frames: a hijacked node sends a fake Controller Area Network (CAN) frame and receiving nodes action it as if it came from a legitimate node.
  Denial of service [DoS]: the bandwidth of the bus is consumed so that legitimate traffic cannot get through in time.

A known method of protecting the bus against spoofing [Anti-spoofing] is for a chip to be attached to the host microcontroller [MCU] to detect an outgoing Controller Area Network (CAN) frame, match it against a list of allowed frames (a whitelist) or illegal frames (a blacklist) and then if the frame is not legal it is destroyed by injecting an error frame that causes all Controller Area Network (CAN) controllers to reject the frame and resync.

The problem with this method is that it requires the lists to be created and maintained, and it also is missing any context as to whether a frame is legal. For example, is a frame from the infotainment system containing a command to deactivate the airbag legal? It depends on whether the driver actually pressed a button or whether the software has been hacked and is faking the message. But there is no way to tell in such a simple blacklist/whitelist model.

A DoS attack is where use of the Controller Area Network (CAN) bus is denied to legitimate nodes. This can take several forms:
1. Flooding the bus with a legitimate message. Controller Area Network (CAN) operates a priority scheme and if a high priority frame is continuously sent on the bus then all lower priority messages will be permanently locked out.
2. Pulling the Controller Area Network (CAN) TX pin low for at least six bit times when a legitimate node is transmitting a Controller Area Network (CAN) frame. This will trigger the Controller Area Network (CAN) error recovery protocol and cause the nodes to resync and the sending node to re-send the frame (which can be attacked again and again). The Controller Area Network (CAN) controller of the legitimate node will follow Controller Area Network (CAN) protocol rules and eventually take itself Bus Off where it cannot send or receive Controller Area Network (CAN) frames. This is called the Milano Attack after a research group in Milano that demonstrated it.
3. Transmitting a valid frame but deliberately create errors in it so that other legitimate nodes will detect the error and destroy it. This is like a flood attack except that the application software at the receiving nodes does not see the frame and so does not detect a flood. In addition, all the receiver Controller Area Network (CAN) controllers on the bus will go into Error Passive mode (which severely limits how they can send Controller Area Network (CAN) frames).
4. Injecting a dominant bit into the Inter-Frame Space [IFS] field at the end of every Controller Area Network (CAN) frame, forcing each controller to go through the Controller Area Network (CAN) error recovery protocol in an infinite loop. This effectively locks the bus against all Controller Area Network (CAN) traffic (and will drive all legitimate Controller Area Network (CAN) controllers Error Passive).
5. Hold the Controller Area Network (CAN) TX pin permanently low, preventing all signals on the bus. A node with failing hardware or software will sometimes behave as if attacking the bus.

There are some known mitigatory against these attacks. For example, regarding point (5) there are existing transceivers that run simple timers that detect if there is a stuck fault with the Controller Area Network (CAN) TX pin. There are also existing transceivers that protects against a flood attack by using a simple 'bucket' algorithm to check that frames are not sent too frequently.

The main problem for a providing a secure approach to DoS protection is that any solution must be complete i.e. it cannot mitigate some attacks but then leave other vulnerabilities in place because a malefactor will simply exploit the remaining vulnerabilities.

The present invention, at least in its preferred embodiment, seeks to address these problems.

KNOWN PRIOR ART

The following prior art for inserting binary data into a Controller Area Network (CAN) frame is acknowledged:
  "CAN protocol enhancement", CAN in Automation Newsletter 3/2018 (see can-newsletter.org or haps://can-newsletter.org/uploads/media/raw/a97cf05a50e5acab5976710d0c5bf7ee.pdf)
  High Speed Embedded Protocol for Distributed Control Systems—US 2014/0328357 A1 (CONCIO Holdings LLC)
  US 2014/0032800 discloses a known Controller Area Network (CAN) message filter, namely a device that sits between a control unit and the Controller Area Network (CAN) bus and performs checking and filtering of Controller Area Network (CAN) frames according to rules embodied in the device. Each device must be programmed with its own set of rules.

SUMMARY OF THE INVENTION

In a first broad independent aspect, the invention provides a serial communication system for communicating data over a Controller Area Network (CAN) bus comprising a security slave device located between a first system node and a Controller Area Network (CAN) bus; and characterised in that:
  Said security slave device further comprises a tagging means for inserting data indicative of said first node into a Controller Area Network (CAN) frame received from said first node;

Said system further comprises a security master device, located between said Controller Area Network (CAN) bus and a second system node;

Said security master device further comprises a means of extracting said data indicative of first said node from a received data frame; and Said system further comprises a means of checking the validity of received Controller Area Network (CAN) frame associated to said extracted data indicative of said first node.

This configuration provides the following advantages:

The security slave device tags the outgoing frames from a system node, with data that is indicative of the system node. Thus allowing the security supervisor system to know the origin of the Controller Area Network (CAN) frame; and To provide information about the current Controller Area Network (CAN) frame being sent on the bus before the frame has been fully received. The information allows the security supervisor to decide what to do about the Controller Area Network (CAN) frame and what to do about the stations/nodes arranged on the bus. This information includes the tag data of the Controller Area Network (CAN) frame that was inserted by the security slave device.

The present inventive concept is different from known arrangements. The slave device contains no rules and merely injects extra hidden data into outgoing Controller Area Network (CAN) messages to indicate from where they came. A central supervisor then uses that extra data to perform checking against a single set of rules for the whole network, destroy the ongoing Controller Area Network (CAN) frame transmission if those rules are violated, and if necessary sending a message back to the slave to command it to disconnect its host. The slave is therefore 'dumb' and knows nothing of the system design in which it is embedded, which is a very different design to prior disclosures.

Preferably, said system further comprises a security supervisor means, which further comprises a means of providing a first signal, which in use, is communicated to said security master device if said data indicative of said first node is not valid.

This configuration is advantageous because the security supervisor means generates a second alarm/indicating signal when the tagged ID of the originating node for the received Controller Area Network (CAN) frame is not valid, and is then subsequently communicated to the security master device.

Preferably, said security master device further comprises a means of deleting a received Controller Area Network (CAN) frame, which in use, is initialised upon receiving said first signal.

This configuration is advantageous because it destroy the current frame on the Controller Area Network (CAN) bus when the security master device receives a delete command/signal from the security supervisor means.

Preferably, said security supervisory function further comprises a means of providing a second signal, which in use, is communicated to said security slave device if said data indicative of said first node is not valid.

This configuration is advantageous because the security supervisor means generates a second alarm/indicating signal when the tagged ID of the originating node for the received Controller Area Network (CAN) frame is not valid, and is then subsequently communicated to the security slave device.

Preferably, said security device further comprises a means of preventing the communicating of Controller Area Network (CAN) data frames from said first system node to said Controller Area Network (CAN) bus, which in use, is initialised upon receiving said second signal.

This configuration is advantageous because it disconnects the host node/microcontroller incorporated within the first node from the Controller Area Network (CAN) bus, when it receives a disconnect command/signal from the security supervisor means.

Preferably, said data indicative of said first node is formed in a first binary word which comprises an address assigned to said first node.

This configuration is advantageous because the first binary word contains a binary address, which has been mapped to a specific system node/station. Thus enabling a received Controller Area Network (CAN) data frame to be tagged with data indicative of its origin.

Preferably, said inserted data indicative of said first system node further comprises a second binary word which comprises data indicative of an error detection code.

This configuration is advantageous because it enables the system to verify the data inserted into the received data frame. Thus if the check code detects an error, a corrective action can then be subsequently taken by the system, against the potential corruption of the data inserted in to the received Controller Area Network (CAN) data frame.

Preferably, said error detection code word is configured as cyclic redundancy check (CRC) code.

This configuration is advantageous because the second binary word contains a binary value, which is indicative of a check value which is known and expected. The value is typically derived from polynomial division of the data inserted into the Controller Area Network (CAN) frame.

Preferably, said security master device further comprises a communication means for communicating said extracted data indicative of said first system node to a security supervisor comprising a processing means arranged in said second system node.

This configuration is advantageous because it enables the extracted data indicative of the system address of the first system node to be transmitted to a processing device (i.e. a microcontroller device) which is remote to the received Controller Area Network (CAN) data frame for further processing.

Preferably, said processing means further comprises a data array, whereby each data element of said data array is indicative of an arbitration value associated to each system node within said system.

This configuration is advantageous because it provides the controller with data which is indicative of each arbitration field that has been mapped to a specific system node. Thus providing the controller with an address map of all the system nodes contained within the system.

Preferably, said checking means further comprises a means of selecting each said data element of said data array, which in use, selects an arbitration value which is associated to said data indicative of said first node and compares said arbitration value with the arbitration field of the received Controller Area Network (CAN) data frame.

This configuration is advantageous because it enables the system to compare the known arbitration value for the first system node and compare it with the arbitration value contained within the arbitration field of the received Controller Area Network (CAN) data frame. The correct known arbitration for the first node is selected via the ID information tagged to the received Controller Area Network (CAN) data frame.

The present inventive concept also provides a security slave device according to any of the above features comprising said tagging means and said deletion means of the claims.

This configuration is advantageous because it provides an independent security slave device, which is compatible with the system.

Preferably, a security master device according to any of the above features comprising said extraction means and said communication means.

This configuration is advantageous because it provides an independent security master device, which is compatible with the system.

In a second broad independent aspect, the invention provides a method of communicating data over a Controller Area Network (CAN) bus within a serial communication system comprising a security slave device located between a first system node and a Controller Area Network (CAN) bus and characterised in the steps of:

Inserting data indicative of a first node into a Controller Area Network (CAN) data frame received from a Controller Area Network (CAN) bus, via a tagging means comprised within a security slave device;

Extracting said data indicative of said first node from a Controller Area Network (CAN) data frame received from a Controller Area Network (CAN) bus, via an extracting means comprised within a security master device, whereby said security master device is located between said Controller Area Network (CAN) bus and a second system node;

Checking the validity of extracted data indicative of said first node, via a checking means comprised within said system.

This method is advantageous because it provides a Controller Area Network (CAN) data frame which has been tagged with binary data which indicates the ID of the system node from which the Controller Area Network (CAN) frame originated from. In use, the tagged data is inserted in to the data frame by a security slave device associated to the system node. The tagged data frame is then transmitted to a security master device, via a connecting Controller Area Network (CAN) bus. The security master device then extracts the tagged data from the received Controller Area Network (CAN) frame and transmits the extracted tagged data to a controller/host device which is associated to the security master device. The controller/host device then checks the validity of the received ID for which the Controller Area Network (CAN) data frame was sent. If the received ID is not valid then the security supervisor then sends a signal and/or message to the security slave device associated to the node from the data originated from.

A BRIEF DESCRIPTION OF THE FIGURES

A DETAILED DESCRIPTION OF THE FIGURES

Figure 1:
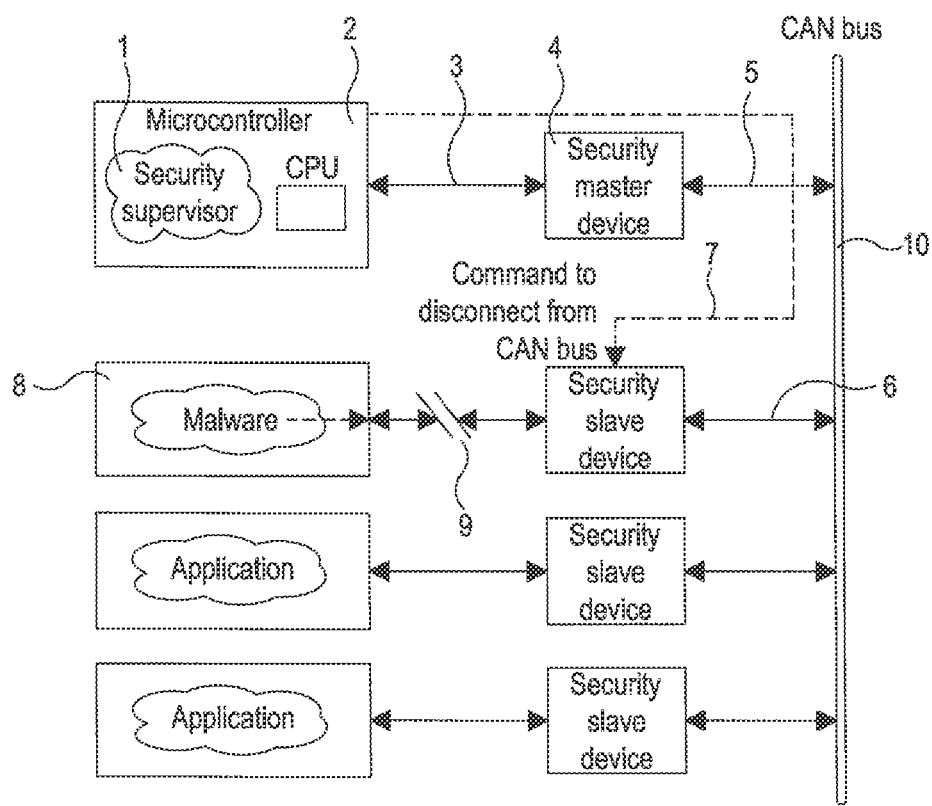
FIG. 1 shows a block diagram illustration of the invention incorporating both the security master device and security slave devices.

FIG. 1 shows a microcontroller 1 incorporating a security supervisor software means 2, which sends a command via a security master device 3, arrows 4, 5 and 6. This command is handled by the security slave device 7 at the system node that has been detected as the source of attacks (e.g. malware 8). The security slave device 7 then disconnects 9 the node 8 from the Controller Area Network (CAN) bus 10, thus preventing further attacks.

In use, the invention provides a system which incorporates mechanisms to protect the Controller Area Network (CAN) bus, but also leaves the security policies to be decided elsewhere (typically a local or remote security supervisor that can take into account a system's context, ranging from simple modes of operation to geographic location).

The security slave device may be embodied in a small low cost chip at every node that needs protection, and then run a security supervisor at a trusted place that has a security master device that provides functions for the security supervisor system, which can then send control messages that are handled by the security slave devices.

The security slave device does not incorporate any whitelist or blacklists. All the security policy decisions are taken by the central security supervisor.

The security slave device has two main functions:
1. To tag outgoing Controller Area Network (CAN) frames with the node ID. This lets the security supervisor know where the Controller Area Network (CAN) frame came from.
2. To disconnect the host from the Controller Area Network (CAN) bus when it receives a command from the security supervisor.

The security master device has two main functions:
1. Provide information about the current Controller Area Network (CAN) frame being sent on the bus before the frame has been fully received. The information allows the security supervisor to decide what to do about the Controller Area Network (CAN) frame and what to do about nodes on the bus. The information includes the tag of the Controller Area Network (CAN) frame that was inserted by the security slave device.
2. Destroy the current frame on the Controller Area Network (CAN) bus when it receives a command from the security supervisor.

Figure 2:
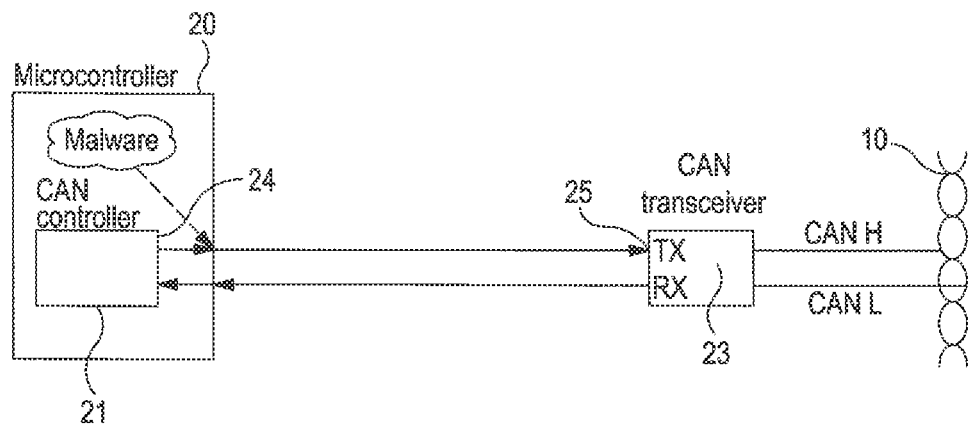
FIG. 2 shows a block diagram illustration of a prior art Controller Area Network (CAN) system node connection with malware installed on the host node.

The security slave device. FIG. 2 shows a prior art configuration, which incorporates a microcontroller 20 with a Controller Area Network (CAN) controller 21 connected to a Controller Area Network (CAN) bus 10 via a transceiver 23. The Controller Area Network (CAN) TX pin 24 in the microcontroller 20 is connected to the Controller Area Network (CAN) TX pin 25 on the transceiver 23, which drives the value on to the Controller Area Network (CAN) bus wires 10.

In use, any malware executing in the host CPU can either manipulate the Controller Area Network (CAN) controller or can directly manipulate the Controller Area Network (CAN) TX pin. This allows it to launch spoofing and DoS attacks on the bus.

Figure 3:
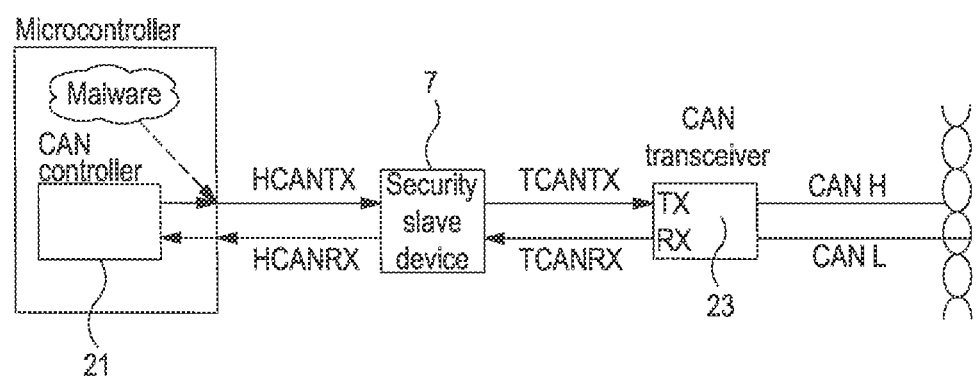
FIG. 3 shows a block diagram illustration of the invention incorporating a connection to a Controller Area Network (CAN) system node via a security slave device.

FIG. 3 shows a modification of the configuration shown in FIG. 2, which is in accordance with the preferred embodiment of the invention. The security slave device 7 is placed on each node and is located between the Controller Area Network (CAN) controller's 21 pins and the transceiver's 23 pins.

The security slave device 7 contains a minimal configuration, this information being:
- A node ID (typically between 4 and 7 bits, allowing 16 to 128 nodes on a Controller Area Network (CAN) bus).
- Bus profile (which selects between common sets of parameters, such as Controller Area Network (CAN) baud rate, sample point, etc.).

This information can be burned into the security slave device using known one-time programmable memory (e.g. fuses or EEPROM). Thus these information settings cannot be changed by the host microcontroller.

The security slave device 7 performs the following functions:
- Tagging any outgoing Controller Area Network (CAN) frame with the node ID using extra Fast Bits (in a similar way as the enhanced payload of the existing CAN-HG patent application).
- Monitoring the HCANTX line from the host microcontroller and checking that the signal is consistent with that of a Controller Area Network (CAN) controller.
- Destroying any outgoing frame with a Controller Area Network (CAN) ID of 0 (the highest priority Controller Area Network (CAN) frame ID).
- Destroying any received frame with a valid tag but that matches the node's own ID.
- Keeping a counter for the number of times an error frame was generated by the host microcontroller in suspicious circumstances.
- Remembering the Controller Area Network (CAN) ID of the last frame transmitted by the host that ended in error before the frame was completed.
- Handling commands broadcast by a security supervisor (which are sent in a Controller Area Network (CAN) frame with a Controller Area Network (CAN) ID of 0).

There is no software required in the host microcontroller to control or interact with the security slave device. The security slave device acts autonomously and obeys commands from the security master device.

The functions of the security slave device are now described in detail.

Frame Tagging

Figure 4:
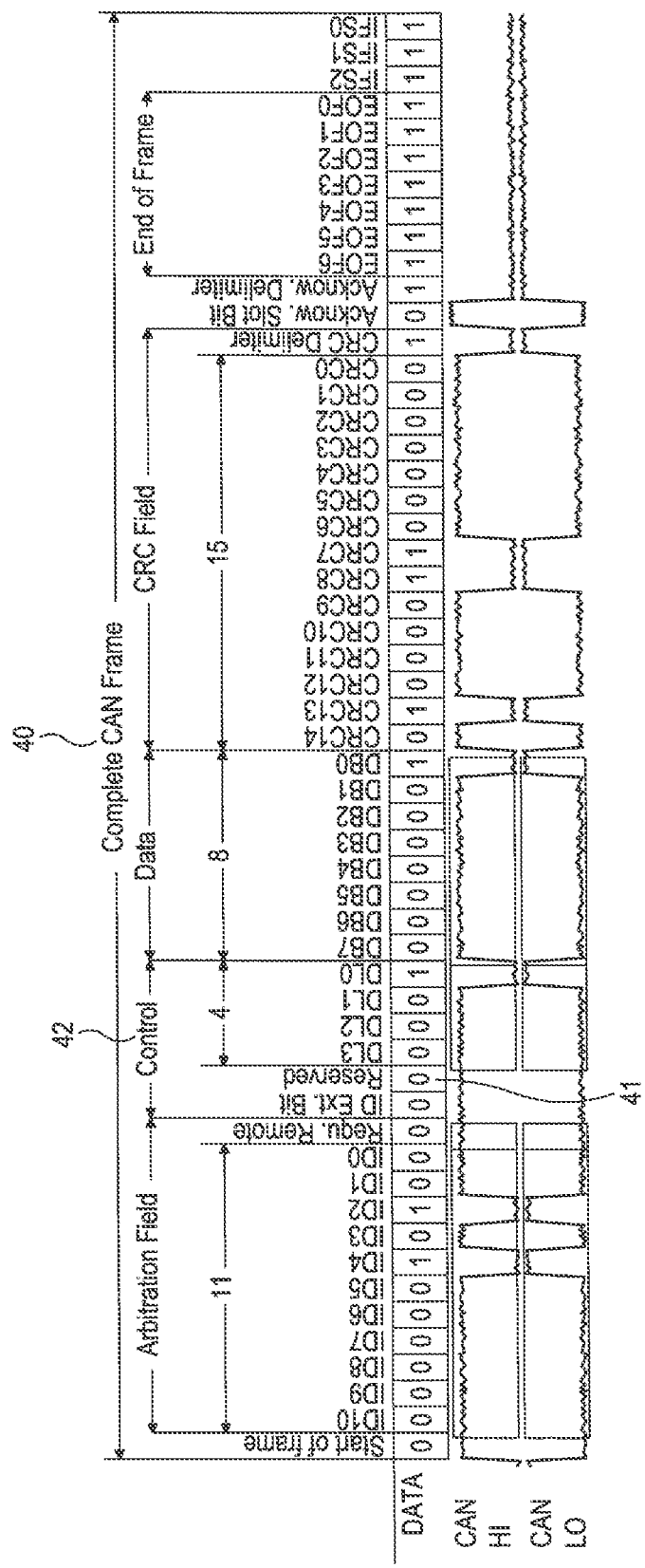
FIG. 4 shows the format of a basic Controller Area Network (CAN) data frame.

FIG. 4 shows a transmitted Controller Area Network (CAN) frame 40. The security slave device injects Fast Bits into transmitted Controller Area Network (CAN) frames in the reserved bit r0 within the control field 42 of the frame 40. Thus, the transmitted Controller Area Network (CAN) frame is tagged via the security slave device.

Figure 5:
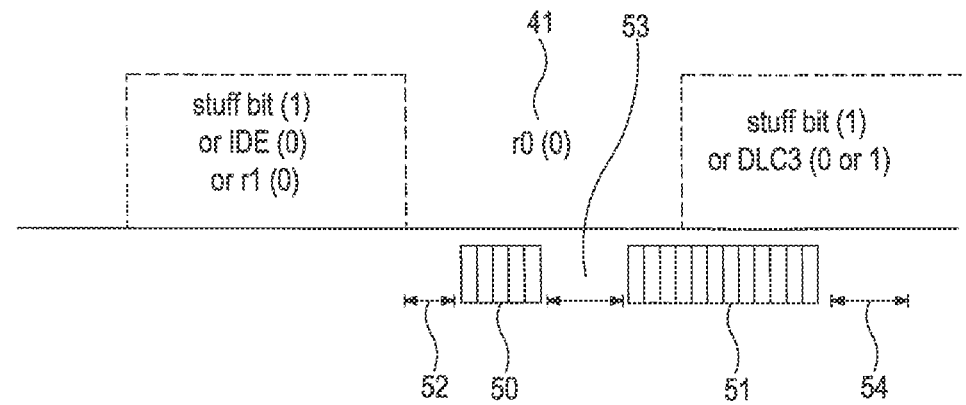
FIG. 5 shows the position of tagged data within a carrier Controller Area Network (CAN) data frame.

FIG. 5 shows an enlarged view of the reserved bit r0 41 within the control field, along with the loaded fast bits 50, 51, the sampling points for r0 52, 53 and DLC3 54.

In use, the bit before the r0 bit may be a recessive stuff bit (i.e. a 1) or a dominant bit (i.e. a 0). If there is a falling edge then there must be a delay to allow all the Controller Area Network (CAN) controllers to see the falling edge and perform the soft sync according to the Controller Area Network (CAN) protocol. After this delay there can be some Fast Bits, before the sample point window, and then more stuff bits after the sample point window. The bit after the r0 bit may be a 1, so the Fast Bits cannot generally be injected beyond the beginning of the sample point window.

The timing parameters that characterise the Fast Bits for tagging are:
- Duration of a fast bit
- Initial skip time
- Number of Fast Bits after the initial skip
- Sample point skip time
- Number of Fast Bits after the sample point skip A typical configuration of the invention has 6 Fast Bits in the first group (e.g. a first binary word) and 12 bits in the second group (e.g. a second binary word), thus providing 18 bits of tag (a smaller or larger number of bits may be achievable, depending on the characteristics of the network).

In another configuration of the invention the number of tag bits available is larger than that needed to uniquely encode the node ID. For example, the tag might be 18 bits but only 6 bits of node ID is needed for up to 64 devices on a single Controller Area Network (CAN) bus, giving 12 spare bits. In a typical embodiment two of these bits are used to produce a pulse so that the receiver can determine the optimal sample point and sample method to decode the bits.

The rest of the spare bits can be used for a check code (typically a CRC) so that the security Manager device can determine if the tag has been corrupted or not. Because the node ID is fixed the check code can be fixed and the whole tag programmed once when the chip is first configured rather than having hardware to calculate the check code dynamically. There can be any arbitrary algorithm used for the check code but in the preferred embodiment a 9-bit CRC is used with a polynomial of 0x13c which covers a node ID of up to 8 bits at a Hamming Distance of 6.

Monitoring of the Timing of the HCANTX Signal

In use, a host CPU executing malware could attack a Controller Area Network (CAN) frame in many different ways using carefully timed pulses. The security slave device monitors the HCANTX line to check to see if edges appear at the wrong times, which is an indication that the host is not running a proper Controller Area Network (CAN) controller but rather malware directly controlling the TX pin.

A pulse from the host is a well-formed Controller Area Network (CAN) bit if:
- The bit is of the right length (the pulse cannot be too short)
- The bit is phased to start and finish at the start/end of the Controller Area Network (CAN) bit in the security device (the pulse cannot start part way through a Controller Area Network (CAN) bit).

The Controller Area Network (CAN) protocol defines a Controller Area Network (CAN) bit as being made from a fixed number of time quanta, which are clock ticks where all events take place. The security slave device is typically configured to have the same number of time quanta per bit as the host Controller Area Network (CAN) controller, where tq equal to 0 is the first time quantum and tq equal to nbt is defined as the last time quantum (e.g. with 16 time quanta per bit and a bit time of 2000 ns a time quantum is 125 ns long, and nbt=15). The security slave device contains a state machine that follows the Controller Area Network (CAN) protocol rules for synchronising bits and for receiving Controller Area Network (CAN) frames. It is synchronised with all Controller Area Network (CAN) controllers on the bus using the Controller Area Network (CAN) protocol rules, and therefore expects to be synchronised with the host Controller Area Network (CAN) controller.

In order to check the bit timing rules, the security slave device needs to know if a Controller Area Network (CAN) bit was initiated by the host or from the bus. A rising edge on HCANTX is always initiated by the host at the end of a bit. A falling edge of HCANTX is initiated by the host if TCANRX=1 at the falling edge. If TCANRX=0 then some other device on the bus initiated the falling edge and the host is synchronising with it.

Specific rules for bit timing are:
1. A falling edge on HCANTX initiated by the host should happen with tq=nbt−1, tq=nbt, tq=0 or tq=1 in the security slave device. An exception to this rule is when the falling edge is at the start of frame [SOF]—Controller Area Network (CAN) controllers are not expected to be in sync at this event.
2. A host-initiated falling edge of HCANTX should always happen after a recessive pulse of duration nbt time quanta. The soft sync rules of the Controller Area Network (CAN) protocol will shorten or lengthen a bit but this only happens for dominant bits.
3. The duration of a dominant HCANTX pulse after a host-initiated falling edge should be nbt time quanta. This is because such a pulse must be a bit transmitted by the host and the soft sync rules of the Controller Area Network (CAN) protocol should not shorten or lengthen the transmitter's bit.
4. A rising edge on HCANTX should always happen at tq=adjnbt, tq=adjnbt−1, tq=0 or tq=1, where adjnbt is the value of nbt temporarily adjusted by the soft sync rules of the Controller Area Network (CAN) protocol to shorten or lengthen a bit.

These rules are checked in the state machine of the security slave device and any violations are noted for the current Controller Area Network (CAN) frame.

Controller Area Network (CAN) Frame Anti-Spoofing.

Controller Area Network (CAN) ID 0 is always used as the ID of frames containing commands from the security supervisor. Any node with a security slave device is, by definition, not the security master device and therefore the frame is being spoofed. The security slave device will delete this frame by initiating an error frame according to the Controller Area Network (CAN) protocol rules. Once the frame is deleted, the TCANTX line is set to recessive for a short period of time (typically 512 Controller Area Network (CAN) bit times) to block the host and allow time for the security supervisor to decide to send a command frame (with Controller Area Network (CAN) ID 0) to instruct the security slave device to permanently take the host off the Controller Area Network (CAN) bus.

In the preferred embodiment the security slave device extracts and checks the tag of a frame received from the Controller Area Network (CAN) bus (rather than transmitted from its host) and if the tag is valid and the node ID matches the node ID stored in the security slave device then the frame must be a spoof and the security slave device will delete this frame using the same mechanism as for frames with Controller Area Network (CAN) ID 0. The advantage of this feature is that a node that has been directly connected to the Controller Area Network (CAN) bus without using a security slave device can be prevented from spoofing Controller Area Network (CAN) frames.

The Bogus Error Counter [BEC]

When an error frame is detected, the BEC is incremented if any of the following are true:
There was a malformed bit sent by the host detected during the transmission of the Controller Area Network (CAN) frame before the error frame.
The Controller Area Network (CAN) frame was being received and the host started transmitting a dominant bit before the security slave device detected an error (i.e. the host unilaterally decided there was an error).
The Controller Area Network (CAN) frame was being transmitted when the security slave device detected an error and the bit value sampled by the host on TCANRX is the same as HCANTX (i.e. the error was caused by what the host transmitted, not some noise another device detected on the bus).

If the BEC reaches a threshold then the security slave device automatically prevents the host from transmitting on the Controller Area Network (CAN) bus for a short time by setting TCANTX to 1. This is to ensure that security supervisor command frames cannot continuously be destroyed and that a command frame will eventually be transmitted.

Remembering the Controller Area Network (CAN) ID

If a transmission of a Controller Area Network (CAN) frame from the node ends with an error then the security slave device remembers the Controller Area Network (CAN) ID.

Handling Commands from the Security Supervisor

Commands from the security supervisor are in the payload of a Controller Area Network (CAN) frame with ID 0 (this ID is protected from spoofing by anti-spoofing of Controller Area Network (CAN) ID 0 by the security slave device (see above) and also anti-spoofing at the security master device).

The commands from the security supervisor include the following:
"Block the host if node ID=x"
"Block the host if node ID x and the remembered Controller Area Network (CAN) ID=y"
"Block the host if BEC>x"
"Unblock the host if node ID=x"
"Reset BEC if node ID=x"
"Set the BEC autoblock threshold to x if node ID=y"

Figure 6:
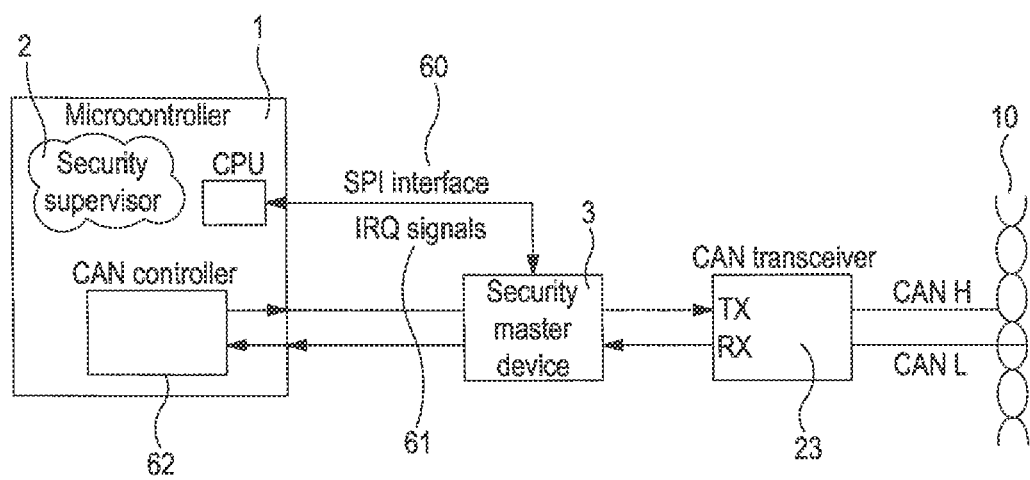
FIG. 6 shows a block diagram illustration of the invention incorporating a connection to a Controller Area Network (CAN) system node via a security master device.

FIG. 6 shows the security master device 3. The security master device provides functions to enable the security supervisor 2 to implement an appropriate security policy. In a typical implementation the device is interfaced to the host MCU 1 via Serial Peripheral Interface (SPI) interface 60. This link provides data to the host and carries commands from the host to the Controller Area Network (CAN) bus 10, via a Controller Area Network (CAN) controller 62, security master device 3 and Controller Area Network (CAN) transceiver 23. An interrupt request line 61 is used to generate interrupts on the host when certain events have been detected by the security master device 3. This arrangement allows the security policy to be performed by software.

The security master device provides following functions.

Timestamping a Frame

The SOF event is timestamped by the security master device. The timestamp can be read out via SPI when the security supervisor receives a Controller Area Network (CAN) frame. In a typical embodiment the timestamp is 32 bits measured in microseconds.

Decoding Tag Bits

All the tag bits are provided to the host over an SPI link. Either hardware or software can be used to check the validity of the tag using the check code embedded in the tag. and so decide if the tag is valid or corrupted.

Raising Interrupt requests

There are two sources of interrupts:
At the end of the arbitration phase of the Controller Area Network (CAN) protocol. At this point the Controller Area Network (CAN) ID, tag and timestamp are known.

When an error frame is detected. At this point only the timestamp is certain to be known.

Deleting a Controller Area Network (CAN) Frame

The security supervisor can generate a request over SPI that the current Controller Area Network (CAN) frame is to be deleted. The security master device does this by generating an error frame. The request includes a sequence number generated by the security master device so that by the time the request from the security supervisor arrives if the frame has already been destroyed (e.g. a Controller Area Network (CAN) error detected and an error frame already generated) then the request is ignored and not misapplied to a subsequent frame.

The security supervisor uses features of the security slave device at each node and its own security master device to protect the Controller Area Network (CAN) bus. These mechanisms are described below.

Anti Spoofing

The security supervisor deems a frame is spoofed if its tag is malformed or if the node ID part of the tag doesn't match the node ID of the authorized sender of frames with the given Controller Area Network (CAN) ID.

The decision takes place after arbitration has been decided and the Controller Area Network (CAN) ID and tag are known. In a typical embodiment the security master device raises an IRQ at the point this information is available and the decision is made by software. The tag is malformed if the node ID is invalid or if the check code does not match.

The security supervisor instructs the security master device to destroy the spoofed frame and then queues a Controller Area Network (CAN) command frame with Controller Area Network (CAN) ID 0. The command is of the following form:

"Block the node if the node ID≠x and the last sent Controller Area Network (CAN) ID=y"

where y is the Controller Area Network (CAN) ID that the security master device received and x is the node ID for the device that is authorized to send a frame with the given Controller Area Network (CAN) ID. All security slave devices will receive and act on this command. The node (or nodes) where the sent frame was spoofed will match y and block access to the bus. Because the ID of the command frame is 0 it is guaranteed by the Controller Area Network (CAN) protocol win arbitration immediately after the spoofed frame has been destroyed.

If the Controller Area Network (CAN) ID received at the security master device was corrupted by an error on the Controller Area Network (CAN) bus and the frame was not actually spoofed then the above command will result in no blocking: the sending node will have recorded the true Controller Area Network (CAN) ID and not the corrupted Controller Area Network (CAN) ID y so the match will fail and so false positives are avoided.

There is no significant bandwidth increase from this mechanism: the frame is destroyed earlier than it would otherwise have been (it typically would have failed a Controller Area Network (CAN) frame CRC check close to the end of the frame) and the total of the arbitration field and a command frame is only slightly more bandwidth in response to an error than that the Controller Area Network (CAN) protocol would otherwise have taken.

The anti-spoofing decision can take account of any arbitrary context. Examples of context include:

Certain frames are valid only in certain operating modes (e.g. frames containing flash programming data should only appear when a system is in programming mode)

Certain frames are valid only within a certain time before or after certain events (e.g. a button press)

Certain frames are valid only while certain physical conditions have occurred (e.g. a physical key being turned)

Certain frames are valid only for particular configurations of a system (e.g. remote control door unlock command frames are valid only if the system is supposed to have a remote control key).

Flood DoS protection

A bus may be flooded with high priority Controller Area Network (CAN) frames that are otherwise valid to send. To detect a flood the timestamp of the start of a Controller Area Network (CAN) frame is used with a calculation of whether too many frames of a type have appeared in the time. This can be a simple model with a given frame type having a budget renewed periodically, or it can be a more sophisticated model that fits with Controller Area Network (CAN) bus scheduling analysis.

The security supervisor issues a command of the following format:

"Block the bus if node ID=x"

The security supervisor can unblock the node later if it appears that the flood was due to a transient fault rather than a deliberate attack.

Bogus Error DoS Attack Protection

A bogus error attack is where Controller Area Network (CAN) frames are destroyed in order to take up bus bandwidth and deny it to legitimate traffic. Examples include:

Triggering an error when no error frame has occurred (the Milano attack).

Sending a deliberately erroneous Controller Area Network (CAN) frame or abandoning an otherwise valid frame part way through transmission.

Transmitting a dominant bit during error recovery to restart the error recovery process.

Each of these error conditions leads to an increase in the Bogus Error Count. The security master device raises an IRQ when an error frame is detected and the security supervisor can decide if a bogus error attack is underway based on the pattern and frequency of errors. It stops the attack by sending a command of the form:

"Block the bus if BEC>x"

The attacking node (or nodes) will then be blocked by each security slave device if the given threshold has been exceeded.

It is possible that some faults can be due to transient errors and merely look like attacks. The security supervisor can run a suitable policy to allow for this. The command:

"Reset BEC if node ID=x"

Allows the BEC to be periodically reset so that a small number of errors in a given interval can be accepted. For example, there is a small chance the host did see a Controller Area Network (CAN) error when the security slave device Controller Area Network (CAN) state machine did not: there may be small differences in when TCANRX is sampled, and the consequent error frame generated by the host could be valid. Although the BEC will be incremented in this case, the security supervisor can every few seconds issue a command to reset the BEC in all security slave devices so that there is no risk of accidentally blocking a node.

The invention claimed is:

1. A serial communication system for communicating data over a controller area network bus comprising:
a security slave device located between a first system node and said controller area network bus comprising:

a tagging device that inserts first node indicator data, identifying said first node in a controller area network frame received at said security slave device from said first node, said first node indicator data comprising fast tag bits in a control field of said controller area network frame;

a security master device, located between said controller area network bus and a second system node, said security master device configured to extract said first node indicator data from said controller area network frame, said security master device further configured to communicate said first node indicator data extracted from said controller area network frame to a security supervisor located in a second system node;

said security supervisor configured to receive said first node indicator data extracted from said controller area network frame and check the validity of said first node indicator data extracted from said controller area network frame received by said security supervisor, said security supervisor further configured to provide an invalidity signal which is communicated to said security master device whenever said first node indicator data is not valid, and generate a disconnect signal that is communicated to said security slave device that disconnects said first node from said controller area network bus.

2. The system according claim 1, wherein said security master device is further configured to delete said controller area network frame that is invalid.

3. The system according to claim 1, wherein said first node indicator data is formed in a first binary word which comprises an address assigned to said first node.

4. The system according to claim 1, wherein said first node indicator data further comprises a second binary word which comprises data indicative of an error detection code.

5. The system according to claim 4, wherein said error detection code word is configured as cyclic redundancy check (CRC) code.

6. The system according to claim 1, wherein said security master device includes a security master processor and a data array, wherein each data element of said data array is indicative of an arbitration value associated to each system node within said system.

7. The system according to claim 6, wherein said security master processor selects said each said data element of said data array and selects an arbitration value which is associated with said first node indicator data and compares said arbitration value with said data array of said controller area network frame received.

8. A method of communicating data over a controller area network bus within a serial communication system comprising a security slave device located between a first system node and said controller area network bus comprising:

inserting first node indicator data, indicative of a first node, into a controller area network frame received from said first system node;

extracting said first node indicator data from said controller area network frame received from said controller area network bus, via a security master device located between said controller area network bus and a second system node;

communicating said first node indicator data extracted from said controller area network frame to a security supervisor located in said second system node;

checking the validity of said first node indicator data extracted from said controller area network frame received by said security supervisor;

communicating an invalidity signal from said security supervisor to said security master device whenever said first node indicator data is not valid;

generating a disconnect signal from said security master device, in response to said invalidity signal, that is communicated to said security slave device that disconnects said first node from said controller area network bus.

* * * * *